July 10, 1928.  1,676,806

W. D. SMALLEY

TURBINE

Filed June 1, 1925   5 Sheets-Sheet 1

Inventor.
WILLIAM D. SMALLEY
By Paul, Paul & Moore
Attorneys

FIG. 2

July 10, 1928.  
W. D. SMALLEY  
TURBINE  
Filed June 1, 1925  
1,676,806  
5 Sheets-Sheet 3

Inventor  
WILLIAM D. SMALLEY  
By Paul, Paul & Moore  
Attorneys

July 10, 1928.

W. D. SMALLEY

TURBINE

Filed June 1, 1925    5 Sheets-Sheet 5

Inventor
WILLIAM D. SMALLEY
By Paul, Paul & Moore
Attorneys

Patented July 10, 1928.

1,676,806

UNITED STATES PATENT OFFICE.

WILLIAM D. SMALLEY, OF MINNEAPOLIS, MINNESOTA.

TURBINE.

Application filed June 1, 1925. Serial No. 34,095.

My invention relates to new and useful improvements in turbines, in which the motive fluid may be steam, gas or air or mixtures thereof under conditions of pressure. More particularly it relates to a turbine comprising a stator and a rotor, having a plurality of buckets or ports arranged at an oblique angle to the periphery of the rotor and adapted to receive and discharge the motive fluid and passing it consecutively back and forth between the stator and rotor, resulting in alternating impact and reaction impulses exerted against the rotor, with consequent expansion and decrease of pressure of the motive fluid until all energy of the fluid is absorbed.

My invention has for its main objects the reduction of the high peripheral rotor speed necessary in the present commercial turbines, thereby reducing the shaft speed to approximately that of reciprocating engines and at the same time increasing the efficiency and economical operation of the turbines, whereby special speed reducing, gearing or electrical power transmission units may be eliminated and a substantial saving in power cost and space effected.

A further object is to provide a turbine having a high and positive starting torque, and which may be started slowly and progressively and run at varying speed and load under efficient control of the operator.

Another object is to provide a turbine of the direct impact and reaction type, in which both the direct impact and reaction impulses will be of substantially equal efficiency and in which for every impulse a comparatively large area of the rotor will be subjected with increased efficiency to the turning action of the motive fluid, resulting in increased velocity, a rapid expansion of the motive fluid, and therefore increased efficiency of the turbine.

A further object is to provide a turbine of an intermittent impulse type that will have a uniform and universally balanced torque whereby vibration under all conditions and loads will be negligible.

Further objects are to provide a turbine in which there will be practically no chance for breakage or displacements of parts and which will be inexpensive of manufacture and economical in upkeep.

The invention consists essentially in an improved novel construction of the stator and rotor. More particularly, it consists in a cylindrical stator and a rotor mounted concentrically within the finished bore of the stator, means being provided in said stator and rotor for controlling the flow of the motive fluid whereby distinct and limited volumes of the fluid at initial pressure are cut off and separately confined, which volumes are thereafter repeatedly released into limited or bounded compartments or chambers of increasing cubical contents, each release expanding the volumes and lowering the pressure of the motive fluid as it passes through the turbine.

Suitable means are provided in the structures of the stator and rotor or cooperating therewith to prevent leakage and make effective the control and confinement of the motive fluid, as the rotor revolves. Such means consists in general of accurately grinding and finishing the respective internal and external cylindrical surfaces of the stator and rotor, so that a minimum of clearance so provided between the surfaces, thus permitting the rotor to be operated within the stator without the use of an ordinary lubricant, the motive fluid being the only intermediary or lubricant between said surfaces. Further, said means consists of port areas and intervening spaces in the stator and rotor, and in the provision of suitable stationary packing rings, interposed between the stator and rotor, and separating the zones of different fluid pressures. The compartments or chambers in either the stator or rotor may be provided with only a single port, which will then act as both admission and exit ports, or two ports may be provided for both the stator and rotor chambers, one port then functioning as an admission port and the other as an exit or release port. Both structures are illustrated in the drawings. The chambers and ports are so arranged that when the motive fluid is released from the chambers of one turbine element into the chambers of the other element, it at the same time is transferred in a direction parallel to the axis of the turbine and toward the final exhaust.

Means are provided whereby the open and partially open ports for the flow of the motive fluid and the closed ports are uniformly distributed around the axis of the turbine and that the various points of opening and closing automatically follow the turning rotor and shift therewith around its periphery.

The invention specifically consists in the following detailed constructions and combinations, with reference to the accompanying drawings and particularly pointed out in the claims.

In the accompanying drawings forming part of the specification, there has been disclosed a structure designed to carry out the various objects of the invention, but it is to be understood that the invention is not confined to the exact features shown as various changes may be made within the scope of the claims which follow.

In the accompanying drawings forming part of this specification.

Figures 1, 3:
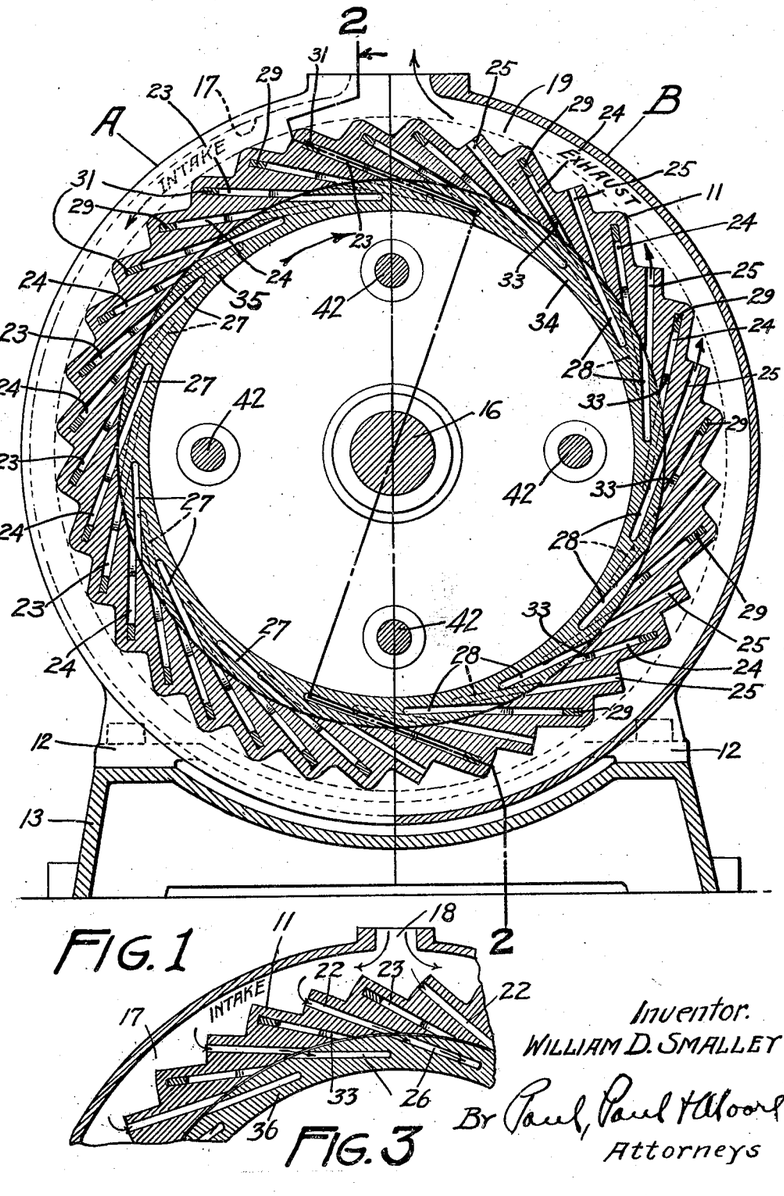
Figure 1 is a vertical sectional view of Figure 2; the left-hand side of the figure, indicated at A, being taken on the line A—A of Figure 2, and the right-hand side of the figure, indicated at B, being taken on the line B—B of Figure 2.
Figure 3 is a detail sectional view on the line 3—3 of Figure 2.

The novel turbine featured in this invention preferably comprises a stator 11 having feet 12 formed thereon whereby it may be conveniently mounted upon a base 13 as shown in Figure 1. A demountable head 14 is secured to each end of the stator to provide closures therefor and to complete the formation of the chamber in which the rotor or rotatable member is mounted. Bearings 15, which may be of any preferred type and construction, are provided in the end plates 14 to support the shaft 16, which is rotatably mounted therein and has the rotor secured thereto.

Figure 2:
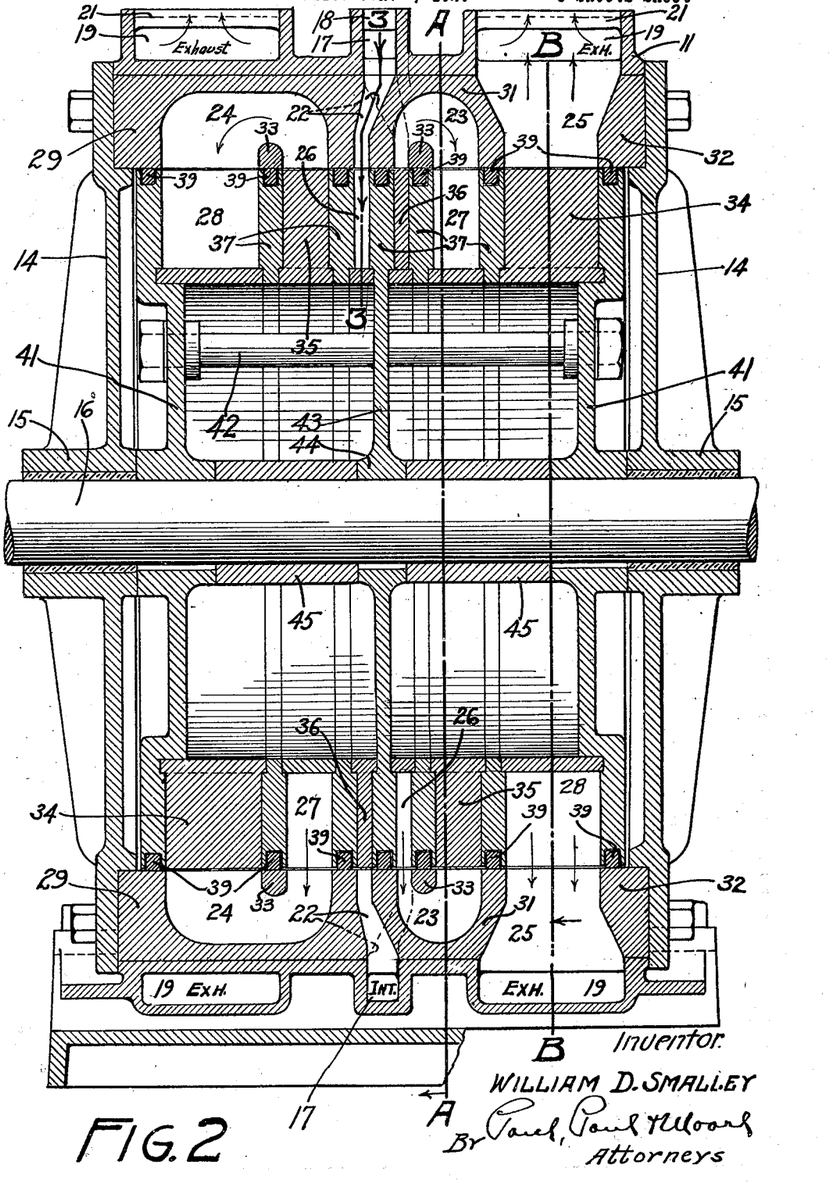
Figure 2 is a vertical sectional view on the line 2—2 of Figure 1.

Referring to Figures 2 and 3, it will be noted that the stator 11 is provided with an annular fluid intake channel 17 having an intake opening 18 preferably at the upper portion thereof to which a suitable supply pipe or conductor (not shown) may be secured. The intake channel 17 is preferably centrally arranged on the stator so that the fluid discharged therefrom into the ports provided in the face of the rotor and in the bore of the stator, will travel outwardly from the center of the turbine towards the annular exhaust channels 19 at each end thereof, as indicated by the arrows in Figure 2. By thus causing the steam to flow in opposite directions through the stator and rotor, the opposed action of the motive fluid will neutralize any tendency to exert an end thrust upon the rotor, thereby causing the rotor to rotate feely within the stator. The anular exhaust channels 19 are also preferably provided with suitable discharge openings 21 at their upper portions, to which a suitable exhaust pipe or other means may be connected for carrying off the exhaust product.

An important feature of this invention resides in the construction and novel arrangement of the containing or confining chambers and their ports provided in the periphery of the rotor and in the bore of the stator. As the fluid diverting ports or nozzles in reality comprise a portion of the confining chambers, to avoid confusion each of these double functioning elements have been supplied with only a single reference numeral in the drawings and will hereinafter in the specification be referred to as "ports." These ports are preferably so arranged and constructed that the motive fluid will be alternately and intermittently passed back and forth between the stator and the rotor until it is finally discharged into the annular exhaust channels 19, thereby exerting a series of direct impact and reaction impulses against the rotor as it passes from the intake channel 17 to the two exhaust channels 19.

Referring to Figures 1, 2, 3 and 4, it will be noted that the stator is provided with a plurality of ports 22, 23, 24 and 25, which are of different sizes. The relatively smaller ports 22 are in direct communication with the annular intake channel 17 and the bore of the stator, as particularly shown in Figures 2 and 3. The relatively larger ports 23 and 24 are arranged on each side of the ports 22 and function as a means for transferring the motive fluid from one rotor port to the next as will subsequently be described. The ports 25 function as a means to conduct expanded motive fluid from each end of the rotor to the annular exhaust channels 19, as indicated by the arrows in Figure 2.

Figure 4:
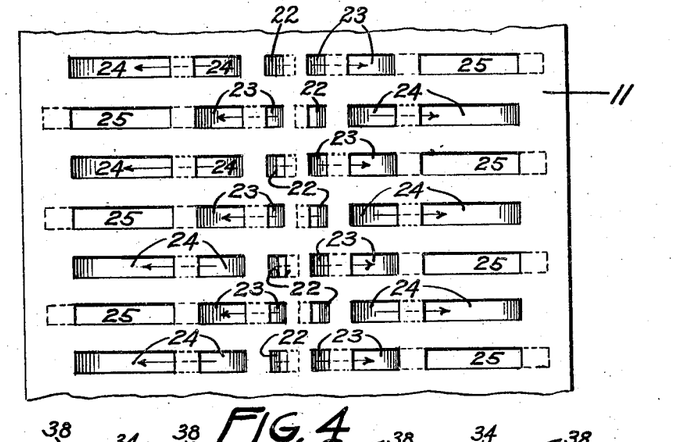
Figure 4 is a diagrammatic plan view of a portion of the stator bore to show the general relation of the chambers and ports therein and the direction of the flow of fluid therethrough.
Figure 5:
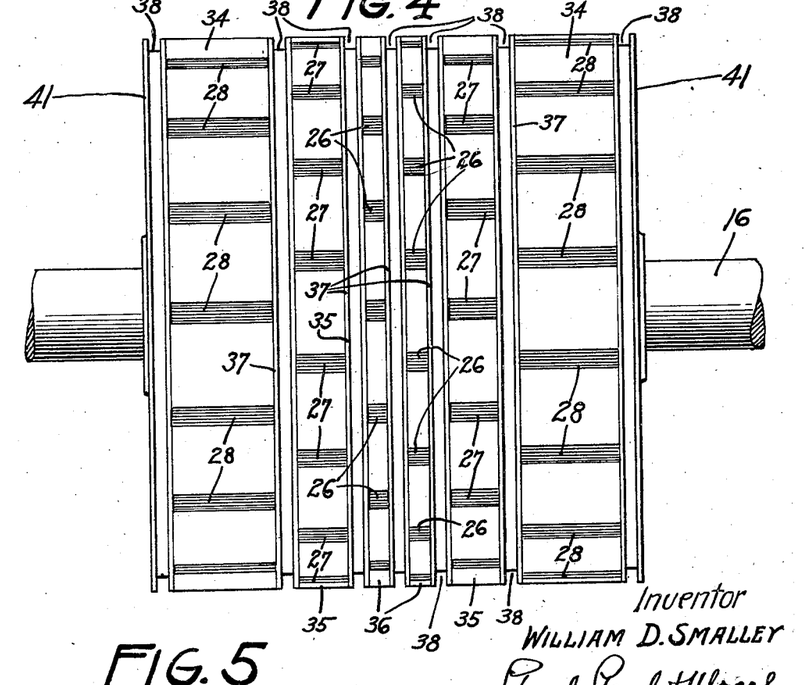
Figure 5 is an elevational view of the rotor removed from the stator showing the staggered relation of the chambers and ports therein.

Referring to Figures 1, 4 and 5, it will be noted that the stator shown in these figures, is provided with thirty-six ports in each cylindrical plane or zone and the rotor with sixteen ports in each plane. As the ports 26, 27 and 28 in the rotor operate both as admission and discharge ports, and as the ports in the stator operate as alternate admission and discharge ports, it is obvious that the sixteen ports in each plane of the rotor will fill and discharge eighteen times for every revolution of the rotor, and, that therefore there will be two hundred eighty-eight impulses exerted against the rotor for each revolution thereof. The staggered relationship of the rotor ports will result in double that number of impulses in the two sections of the turbine, for every revolution of the rotor. As a result of the staggered arrangement of the ports, said ports may be of a less oblique angle or deeper and of more capacity.

The circumferential width of the ports on both rotor and stator is preferably equal for all ports, while the axial length of the ports increases towards the exhaust channels 19. The intervening spaces between the ports may be equal to the width of the ports but are preferably slightly wider as may be noted in Figure 4. By this proportioning of the ratio of ports and space width, the ports will be effectually closed to one port before opening up to the next port as the rotor rotates. The definitely variant numbers of ports in the stator and rotor has a very important effect on the operation of the turbine. For practical reasons the lesser number of ports are preferably arranged in the rotor. It is obvious that if the number of ports in the stator and rotor were equal, they would all be filled and discharged at the same moment, resulting in a tendency to impulse vibration. If the ports and intervening spaces with variant numbers are of equal width, the number of ports perfectly closed and open will always be exactly the same as the difference in numbers between the stator and rotor. The remainder of the ports will be partially open or closed at varying degrees. If the difference in the number of ports is more than one, the closed and open and partially open ports will be distributed uniformly around the axis of the turbine and will shift position uniformly around the axis with rotation of the rotor. In the present instance, assuming ports and spaces equal in width and with thirty-six ports in the stator and thirty-two in the rotor, four ports at ninety degree angles will be effectually closed, and the remainder will be open or partially open for the admission or discharge of the motive fluid. The extra width of the spaces will slightly modify this ratio. It will be seen therefore that the ports taken as a whole are only open to one-half capacity at all times and that the points of partial and full admission are always uniformly distributed around the axis of rotation and will shift and advance with the rotation of the rotor, thereby giving uniform torque effect and in combination with the large number of impulses per revolution, will practically eliminate all impulse vibration.

In starting operation of the turbine it may be assumed that all ports are empty. A motive fluid such, for example, as a mixture of steam and gas, is introduced into the annular intake channel 17, thereby filling all of the ports 22 in the stator which are in direct communication therewith. A majority of these ports will be in communication with ports 26 in the rotor, thereby causing the motive fluid to rush into all of such ports to be filled with motive fluid as indicated in Figures 2 and 3. The kinetic energy of the motive fluid represented by the velocity with which it enters the ports 26 of the rotor, will cause the motive fluid to exert an impact or power impulse thereagainst, thereby causing the rotor to revolve. Such rotation of the rotor will cause the ports 26, which have been filled with fluid, to move out of alignment with the ports 22 in the stator, thereby causing a portion of the fluid to be confined in the ports 26 until they are moved into alignment with the next successive ports 23 as shown in the lower right hand portion of Figure 2. When the ports 26 have been filled with fluid from the port 22, leading from the annular intake channel 17, the fluid pressure in the ports 26 will be substantially equal to the pressure in the intake channel 17. The pressure of the fluid confined in the ports 26, as the rotor revolves, will therefore be substantially equal to the fluid pressure in the intake channel 17.

As soon as the ports 26 are moved into alignment with the ports 23 in the stator, as shown in the lower right hand portion of Figure 2, the high pressure fluid in the ports 26 will be discharged into the relatively larger empty ports 23 in the stator, thereby causing a reaction impulse to be exerted against the periphery of the rotor to tend to increase the rotation thereof. Such transferring of the motive fluid from the rotor ports 26 into the stator ports 23 will equalize the fluid pressure in the two ports and will result in a lower pressure than previously existed in ports 26, after which the rotor ports will be moved out of alignment with the stator ports, thereby causing the fluid in the two ports to be cut off and separated at the common reduced pressure and a portion of the fluid to be confined in the port 23. Continued rotation of the rotor will next cause the ports 27 to be moved into alignment with the fluid filled ports 23 of the stator, thereby causing the fluid confined in the ports 23 to be discharged into the ports 27 of the rotor with resultant expansion and equalization of pressure, reaction impulses being exerted against the periphery of the rotor. As the ports 27, which have been filled with fluid from the ports 23, are moved out of alignment with the latter they will temporarily be closed, thereby causing the fluid in the two ports to be cut off and separated at further reduced pressure. Continued rotation of the rotor will next cause the fluid filled ports 27 to be moved into alignment or opening position with the relatively larger ports 24 in the stator, as shown on the lower left hand side of Figure 2. Such opening of the ports 27 and 24 will cause another reaction impulse to be exerted against the rotor with expansion and equalization of the fluid pressure, after which the ports 27 will pass the ports 24 and cause the fluid in the ports 27 and 24 to be cut off and separated at a still further reduced pressure until the outer larger ports 28 in the rotor are moved into alignment with the ports 24, as shown in the upper left hand corner of Figure 2. Such opening of the ports 24 with the ports 28 will cause the motive fluid flowing from the ports 24 and into ports 28 to exert an impact impulse against the rotor and will also result in a still further expansion and reduction of pressure of the motive fluid. From the ports 28 the expanded fluid is discharged into the ports 25 which are in direct communication with the annular exhaust channel 19, as shown in the lower right hand side of Figure 1. The foregoing description relates to the path of a single isolated volume of motive fluid through the turbine. It will of course be understood that simultaneously therewith a plurality of volumes of high pressure fluid are cut off and separated in the ports 26, amounting to one half the number of ports contained in the rotor, and the same operations are performed through the turbine simultaneously and progressively with these volumes. The propelling force against the rotor is therefore gradually but positively applied when starting the turbine, and the force applied is comparatively greater than when the motor is running at full speed, since at the start there is no opposing force of low pressure fluid contained in the ports. As the rotor has made the first revolution motive fluid under low pressure remains in the ports and this pressure gradually increases up to a certain point, as the rotor gains speed a turbine thus acting as a check to the speed of the rotor.

Figure 9:
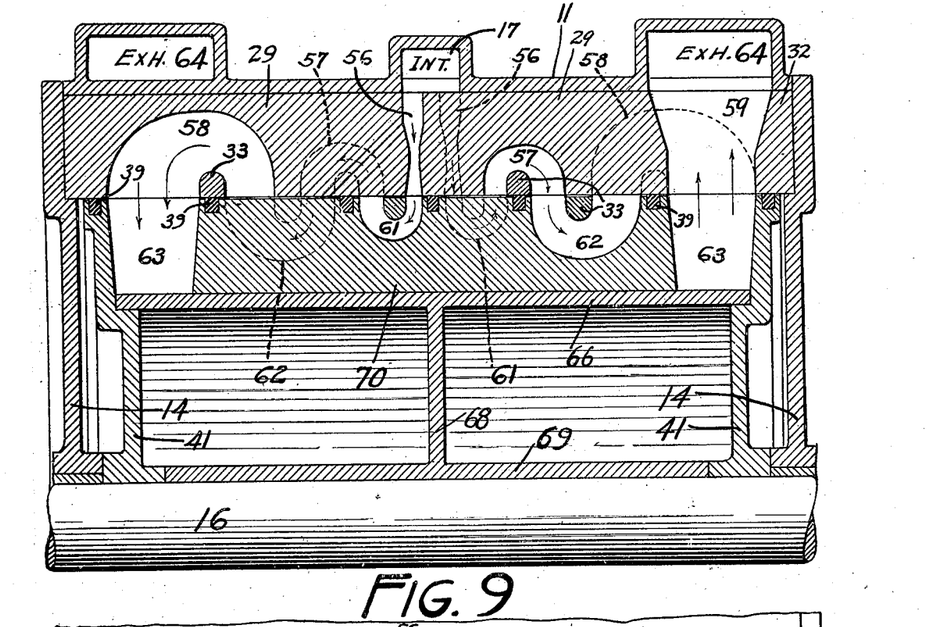
Figure 9 is a detail sectional view on the line 9—9 of Figure 10 showing a modified construction employing a slightly different method of passing the motive fluid from the intake to the exhaust ports.

From the foregoing it will also be noted that, as the motive fluid passes through the turbine from the intake opening 18 to the exhaust channel 19, it will be transferred back and forth between the rotor and stator, as it travels through the turbine, and all the time it is being transferred it will be bounded or confined, resulting in a controlled retardation of the flow of the fluid through the turbine. It will further be noted that while the velocity of the motive fluid is intermittently checked to a degree depending on the peripheral speed of the rotor and the peripheral length of the ports and intervening spaces, the kinetic energy, due to the pressure of the fluid, is still stored up in the fluid after each check and no pressure or energy aside from loss by heat radiation, has been lost. This energy will be exerted instantaneously on each successive release of the fluid and will be equal, proportionate to the pressure for both direct impact and reaction impulses. In the ordinary continuous flow turbine, where there is open communication from the intake of the high pressure fluid to its final exhaust, the rotor blade speed, must be kept at a certain ratio to the velocity of the motive fluid, in order to obtain some measure of efficiency. Any decrease in rotor blade speed below this ratio, due for example to increase in load, does not decrease the rate of fluid flow through the turbine, but increases the exhaust pressure and results in added motive fluid consumption and loss of efficiency. Gas, specifically steam, when flowing through a nozzle from a high pressure into a low pressure chamber, continues to flow in a straight line after leaving the nozzle as long as the pressure in the receiving chamber is above 55% of that in the high pressure chamber, and when the difference in pressure in the two chambers exceeds this percentage, the steam begins to expand in all directions upon leaving the nozzle. One of the essential features of the present invention is to prevent this premature expansion and the loss of kinetic energy, generally resulting from this cause in the ordinary free flow turbines. Means are therefore provided for confining the steam or other elastic motive pressure fluid, in periodically closed pressure channels or chambers, as the rotor rotates. Such means resides in the general formation and relative proportion of these chambers, as shown in Figure 9, where it will be noted that they gradually enlarge in size from the center of the rotor towards the exhaust ports 64. They are proportioned so that the difference in pressure in the high pressure chambers is never greater than sufficient to prevent premature lateral expansion. While it is true, as heretofore stated, that though the motive fluid is progressively expanded in the chambers 61, 57, 62, 58, and 63, as it passes from the intake to the final exhausts, this expansion takes place subsequently to its straight direct flow from the outlet port of the high pressure chamber to the confining wall of the low pressure chamber. After impinging on this wall with its kinetic energy unimpaired, it expands laterally and backwardly in the greater space of the low pressure chambers. This expansion in no way interferes with the direct high pressure flow of the incoming fluid, as it simply raises the initial safe pressure in the low pressure chamber, and thereby more effectively prevents lateral expansion of the high pressure flow.

The pressure of 55% or more in the low pressure chambers is the cause of the straight line direct flow of steam from the inlet port, as it prevents the incoming motive fluid from expanding in all directions. When the pressure in the receiving chamber falls below this percentage, it is insufficient to prevent lateral expansion of the high pressure flow with resulting loss of kinetic energy. It is important, therefore, that the determined ratio between the cubical contents or capacities of the chambers is such that the difference of pressure in the chambers will not exceed the most efficient percentage.

In the present invention the motive-fluid confining ports or chambers are proportioned for the reception and complete expansion between the initial intake ports and the final exhaust ports of a volume of motive fluid, delivering the maximum rated power at a given fluid pressure and rotor speed, and this rotor speed may be as low as desired by providing the equivalent expansion capacity. For a full load on the turbine the first series of chambers are filled to capacity with the motive fluid, and as the ports automatically cut off the flow of high pressure fluid, a definitely limited total volume of the fluid is admitted to the rotor and stator for each revolution of the rotor. This total volume divided into a number of smaller volumes intermittently acts against the rotor by alternating impact and reaction impulses as the ports are opened and closed in its passage through the turbine, each impulse resulting in increased volumes and decreased pressure of the fluid until it is expanded to the desired exhaust pressure. The impact and reaction impulses may be substantially of equal force or any desired ratio of force depending on the chamber and port area. It will also be seen that by a predetermined proportioning of the increased area of the chambers towards the exhaust end of the turbine in combination with the limiting or cut-off system above described, that the high pressure fluid may be made to discharge into chambers containing fluid of any desired ratio of low pressure and that by an increase in port area and a decrease in depth of chambers the strength of each impulse may be materially increased, with a resultant increase in efficiency and economy.

The above relates particularly to full load and speed conditions of the turbine, and, with certain modifications, also to automatically governed variable loads. The governing mechanism however forms no part of the present invention and has been omitted in the drawings and specification.

It will be further noted however, that with the system of automatically controlled and limited flow of the motive fluid through the turbine by the stator and rotor elements themselves as disclosed in this invention, that when starting the turbine with a light or no load, the first impact of the high pressure fluid against the empty but circumscribed buckets of the rotor will have a much stronger tendency to start the rotor than if the fluid had a free escape from the chambers. Especially would this be the case if the first high pressure chambers were larger in volume capacity than necessary for the rated H. P. of the turbine. At the first move of the rotor, this excessive amount of high pressure fluid will be released into the larger chambers, in the stator at high pressure and velocity. The continued turning of the rotor will release the fluid under higher than normal pressure and velocity into still larger chambers and the fluid will continue to flow under higher than normal pressure and velocity until exhausted. The throttle opening for the initial admission of high pressure of fluid can be much less than normal because the stationary position and subsequent low turning of the rotor will give ample time for the chambers to fill. As the rotor gains speed the fluid admission per chamber will be diminished automatically without the throttle opening being changed and the rotor will continue running at a speed commensurate with this throttle opening.

With an uncontrolled and continuous flow of the motive fluid through the turbine as in present practice it is practically impossible to start the rotor slowly and progressively, as it is necessary to turn on the full head and pressure of the steam or other motive fluid in order to overcome the inertia of the rotor. At times this is even so without the pressure of any load on the rotor, as the kinetic energy of the steam can be directed to only a small portion of the rotor blades and only inefficiently as long as the rotor is stationary or moving slowly. If the rotor does not start at once under these conditions it will not start at all, since the steam is permitted to pass freely and uninterrupted through the turbine. With the construction disclosed in this invention the rotor can be started with a small throttle opening and increased turning moment as above explained and can be run efficiently at any speed desired. By alternately confining the motive fluid in the stator and rotor, alternate impact and reaction impulses of substantially equal efficiency will be exerted against the periphery of the rotor, resulting in an added increase in efficiency.

It will also be seen by reference to Figure 1, that by varying the number of ports in the rotor so as to increase or decrease the ratio between the number of ports in the rotor and stator, that practically any desired number of ports 26 may be caused to open and close simultaneously, thereby providing means whereby the number of power impulses functioning at one time may be varied for different requirements in power installations.

Another feature of this invention resides in the novel construction of the stator and rotor which is shown in Figures 1 and 2. As here shown the stator preferably consists of an annular ring, which is bored to the proper diameter to receive the rotor, and the novelty resides in the construction of the chambers or ports 22, 23, 24 and 25. Each set of such ports are in axial alignment with the axis of the shaft 16 and as a result of the ports being rather narrow or small in width, it would be impracticable to mold or cast them in the stator. These ports are therefore preferably constructed by first milling or machining a plurality of inclined grooves in the bore of the stator, which grooves are spaced as shown in Figure 1, or to the proper distances required between the stator ports. A series of irregularly shaped plates or fillers 29, 31 and 32 are mounted in each groove in the stator and are suitably secured thereto so as to become in effect, an integral part of the stator. These fillers are of such size and shape that when they are arranged and spaced in grooves as shown in the upper and lower portions of Figure 2, the ports 22, 23, 24 and 25 will be formed as shown. Small blocks 33 are also mounted in each groove to complete the formation of the ports or chambers 23 and 24. By this novel method of construction of the stator the ports provided therein may be accurately formed at a minimum cost. The stator will also, when completed, provide in effect an integral casting or member, which can not become disarranged in any manner to vary the sizes or locations of the ports therein.

The rotor as shown in Figure 2 may be a plurality of annular rings 34, 35 and 36, which are each provided with a plurality of tangential slots, as particularly shown in Figure 5. These slots form the ports 26, 27 and 28, when the rotor is assembled. Spacing rings or members 37 are provided between the annular slotted rings 34, 35 and 36, as shown in Figures 2 and 5, and these rings are provided with peripheral grooves 38 in which suitable expansion rings 39 are mounted adapted to be yieldably held in contact with the bore of the stator as shown in Figure 3. The rings 39 function to provide pressure tight joints between the ports so as to eliminate any loss of power from fluid leakage. The slotted rings 34, 35, and 36 and the spacers 37 are suitably clamped together for rotation as a unit by means of the end plates or rotor heads 31, which are suitably secured together by means of tie-bolts 42 (see Figures 1 and 2). The central spacer 37 mounted in alignment with the annular intake port 18, preferably has a web 43 integrally formed thereon, which is provided with a hub 44 adapted to be mounted upon and secured to the shaft 16. Spacing collars 45 are also preferably provided between the hubs of the rotor and plates or heads 41 and the hub 44 of the central spacer 37.

By this novel construction of the rotor it will be seen that the ports 26, 27 and 28 may readily be cut or molded in the annular rings 34, 35 and 36, after which the various rotor parts may be assembled as shown in Figure 2 and 5 to rotate as a unit when mounted in the stator.

Figure 6:
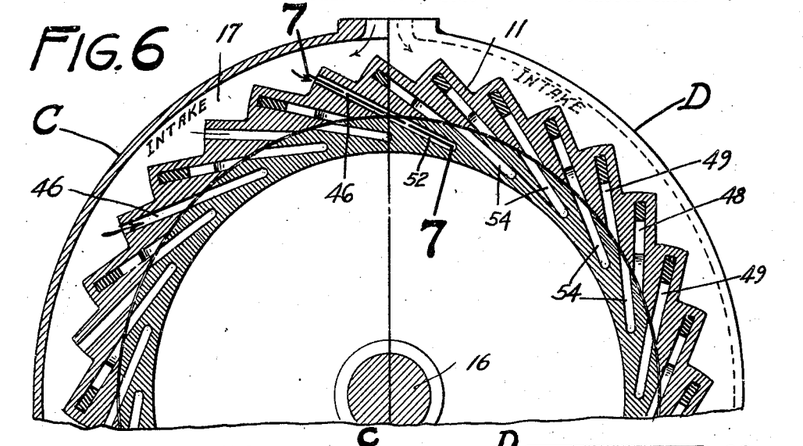
Figure 6 is a modified form and is a vertical sectional view of Figure 7, the left-hand side of the figure indicated at C, being taken on the line C—C of Figure 7, and the right hand side shown at D, being taken on the line D—D of Figure 7.
Figure 7:
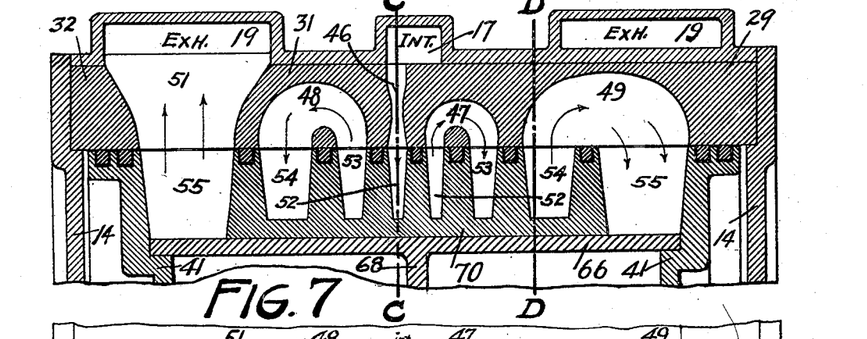
Figure 7 is a detail sectional view on the line 7—7 of Figure 6, showing how the motive fluid in this construction each time passes from the rotor through the stator port and chamber for temporary confinement and expansion until it is again liberated therefrom to pass through a relatively larger stator port and back to a rotor port until it reaches the exhaust shown on the left hand side of Figure 7.
Figure 8:
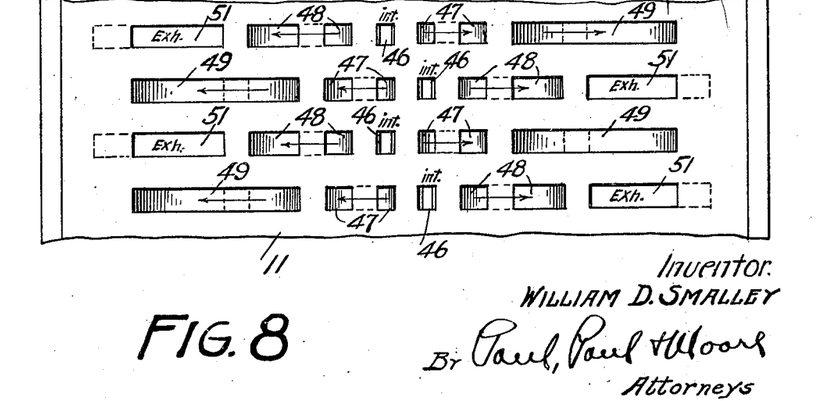
Figure 8 is a plan view of a portion of the stator bore showing the general arrangement of the chambers and ports therein.

Figures 6, 7 and 8 show a modified construction wherein the motive fluid is not confined and expanded simultaneously in one stator chamber and one rotor chamber, but it is generally, except in the first admission into the rotor port 52, confined and expanded simultaneously in two rotor chambers and one stator chamber. The stator in this construction preferably comprises a series of ports 46, 47, 48, 49 and 51; these ports successively increasing in size as shown to allow for the expansion of the motive fluid. The ports 51 are in direct communication with the exhaust channels 19 as shown at the left hand side of Figure 7.

The rotor is provided with a plurality of peripherally and obliquely arranged ports 52, 53, 54 and 55 which are adapted to alternately and intermittently be moved into opening and closing position with the ports in the stator. In this particular construction the ports in the bore of the stator and also those in the periphery of the rotor are aligned as shown in Figure 8.

In the operation of the structure shown in the above figures, motive fluid passes from the annular intake channel 17 through a certain number of the ports 46 and into a like number of rotor ports 52. As the fluid is thus forced into the rotor ports the impact of the fluid against the rotor will cause it to rotate, thereby causing the fluid filled ports to be temporarily closed, resulting in the fluid being confined in such ports until they are moved into alignment with the adjacent ports 47 and the fluid is discharged therein.

Referring to Figure 7 it will be noted that the motive fluid will not be confined in the ports 52 and 47 as shown and described with reference to the previous figures, but that it will be transferred from the ports 52 through the ports 47 and into the adjacent ports 53 in the rotor. Such action of the fluid in passing from the ports 52 into the stator ports 47 will cause a reaction impulse to be exerted against the rotor, which will immediately be followed by an impact impulse, as the fluid flows from the stator ports 47 into the rotor ports 53. The fluid will there be confined and expanded in the stator ports 47 and in the rotor ports 52 and 53 until the latter are brought into alignment with the adjacent stator ports 48, when it will be confined and expanded and the pressure equalized in the rotor ports 53 and 54 and stator port 48. The flow of the fluid from the rotor ports 53, through the stator ports 48 and into the rotor ports 54, will first cause a reaction impulse which will be immediately followed by an impact impulse. Continued rotation of the rotor will move the rotor ports 54 into alignment with the stator ports 49, from which it will immediately flow into the rotor ports 55, expanding and equalizing the pressure in the rotor ports 54 and 55 and the stator ports 49 causing first a reaction impulse followed by an impact impulse. Further rotation of the rotor will separate the ports 55 from the ports 49 and align the ports 55 with the exhaust ports 51, causing a last reaction impulse.

Figure 10:
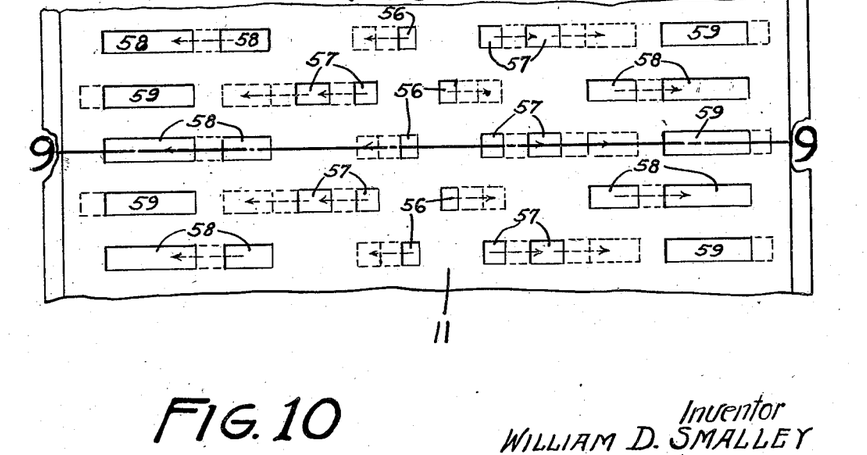
Figure 10 is a detail plan view of a portion of the rotor bore to show the arrangement of the ports therein.

Another modified construction of the ports and a slightly modified flow of the motive fluid is illustrated in Figures 9 and 10 in which the ports in the rotor resemble those in the stator and the motive fluid in the rotor does not pass out of the same port opening by which it entered but is transformed axially in the rotor by the next plane of ports.

In the construction here shown a plurality of ports 56, 57 and 58 are provided in the stator and these ports are symmetrically arranged on each side thereof preferably in staggered relation as shown in Figure 10. A plurality of ports 61, 62 and 63 are similarly provided in the periphery of the rotor adapted to be moved into and out of opening and closing position with the ports in the stator.

In the operation of this structure the motive fluid flows directly from the intake channel 17 through a series of the stator ports 56 and into the relatively smaller rotor ports 61, as shown at the left hand in Figure 9. As the rotor revolves the fluid filled ports 61 will be brought into alignment with the stator ports 57, thereby causing the fluid to flow from the ports 61 and into the stator ports 67, expanding in these two ports. Continued rotation of the rotor will cause the fluid in the ports 57 to be discharged into the relatively larger rotor ports 62 as shown in the right hand side of Figure 9, expanding in ports 57 and 62. From the rotor ports 62 the fluid will flow into the larger stator ports 58, shown at the left hand side and expanding in the ports 62 and 58. From the latter ports it will flow into the rotor port 63, expanding in ports 58 and 63 (left hand side). From ports 63 it will flow into final exhaust ports 69 (right hand side), and from thence into the annular exhaust channel 64.

The construction of the ports of the stator are substantially the same in Figures 1 to 10, but the port construction of the rotors shown in Figures 6 to 10 differs from that shown in Figures 1 and 2 and is a simpler and a preferable construction, similar to the construction of the stator ports.

As here shown the rotor comprises a single main cylindrical member having an outer rim 66 and provided with the heads 41, a central web 68 and a hub 69, which latter is mounted on the rotor shaft 16. The slots or recesses composing the ports are milled straight across at the proper angle in the filler 70, which is adapted to closely fit the cylindrical wall 66 of the member and is cut away to form the desired conformation of the confining chambers. This filler 70 is secured to the wall 66 so as to form a substantially integral component part of the rotor. These fillers may be readily replaced if worn and may also readily be modified in form without other changes in the construction of the rotor being required.

I claim as my invention:

1. In a turbine the combination of a stator and a rotor having motive fluid containing chambers arranged in a plurality of planes around the axis of the turbine, said chambers comprising ports directing the flow of motive fluid in paths oblique to the periphery of the rotor, an annular channel supplying motive fluid to said containing chambers in limited volumes, means cooperating with said containing chambers to periodically open and close communication between said chambers whereby the motive fluid is intermittently transferred from one chamber to another and from one plane of chambers to another, and an annular exhaust channel surrounding the last plane of chambers, the chambers in said last plane being alternately open and closed to the exhaust channel.

2. In a turbine the combination with a stator and a rotor having motive fluid containing chambers arranged in a plurality of planes around the axis of the turbine, said chambers comprising ports directing the flow of motive fluid in paths oblique to the periphery of the rotor, of an annular channel arranged centrally in said stator and in direct communication with only the open chambers of the alternately open and closed containing chambers of the two adjacent central planes of chambers, means cooperating with said containing chambers to periodically open and close communication between said chambers, whereby motive fluid is supplied to said containing chambers in limited volumes and intermittently transferred from one chamber to another and from one plane of chambers to another in opposite axial directions and an annular exhaust channel surrounding the last plane of chambers at opposite ends of the turbine, the chambers in said planes being alternately open and closed to the exhaust channels.

3. In a turbine the combination with a stator and a rotor, of coinciding recesses formed in said stator and said rotor at an oblique angle with respect to the periphery of the rotor and parallel with the axis thereof, filling plates conforming in shape to the axial path which the motive fluid is to take through the turbine, said recesses and filling plates forming chambers and means cooperating with said chambers to periodically open and close communication between the chambers, whereby the motive fluid is intermittently transferred from one chamber to another alternatingly between the stator and rotor.

4. In a turbine the combination of a stator and a rotor having constantly confining motive fluid containing chambers arranged in a plurality of planes around the axis of the turbine, said chambers comprising ports directing the flow of motive fluid in paths oblique to the periphery of the rotor, means cooperating with said ports to periodically open and close communication between said chambers, whereby the motive fluid is transferred from one plane of chambers to another plane of chambers, and packing rings arranged in grooves between the stator and rotor and between one plane of chambers and another.

5. A turbine comprising a stator and a rotor having fluid pressure intake and exhaust chambers including ports and means adapted to consecutively separate and confine limited volumes of a motive fluid in said chambers and alternately pass expanding volumes of said fluid to and from said chambers in opposite directions and in paths oblique to the periphery of the rotor, said volume being constantly confined and enclosed while being intermittently expanded in said chambers.

6. A turbine comprising a stator and a rotor having chambers including ports and means adapted to open and close said ports when said rotor is rotated, the ports in said stator and in said rotor varying in number whereby they are caused to be closed and opened at a plurality of positions around the periphery of the rotor, said positions shifting with the rotation of the rotor, and means for supplying motive fluid to said chambers.

7. In a turbine, the combination with a stator having a rotor concentrically arranged therein, of spaced pressure chambers arranged annularly in the peripheries of said stator and rotor, said chambers having inlet and outlet ports arranged obliquely to the axes of the stator and rotor and adapted to conduct a motive fluid from one pressure chamber to another, when the rotor rotates, and to confine the motive fluid at different pressures therein, said chambers being proportioned to maintain a pressure in the low pressure chambers generally not less than one-half that in the high pressure chambers.

8. In a turbine, the combination with a stator having a rotor concentrically arranged therein, of high and low pressure chambers arranged annularly around said stator and rotor, and in different axial planes thereof, said chambers having inlet and outlet ports arranged obliquely to the axes of said stator and rotor and adapted to conduct a motive fluid from the high to the low pressure chambers, when the rotor rotates, some of said ports being disposed in different axial planes, and said chambers being proportioned to maintain a pressure in the low pressure chamber substantially not less than one-half that in the high pressure chambers whereby, as the motive fluid flows from the high to the low pressure chambers, its expansion in lateral directions is prevented until the kinetic energy of said motive fluid has been expended against the confining wall of the low pressure chambers.

9. A turbine, comprising in combination, a stator and a rotor having concentrically arranged high and low pressure chambers, said chambers having inlet and outlet ports arranged obliquely to the axes of said stator and rotor in different axial planes and adapted to conduct a motive fluid to and from said chambers, when the rotor rotates, means for confining the motive fluid in said chambers and maintaining a pressure in the low pressure chambers substantially not less than one-half that in the high pressure chambers whereby said motive fluid is caused to flow at high pressure in a continued circumscribed path, confined by low pressure motive fluid, until it impinges on the confining wall of the low pressure chamber with its full kinetic energy and thereafter expands to a lower pressure in said chamber.

10. A turbine, comprising in combination, a stator and a rotor having concentrically arranged pressure chambers, an initial high pressure chamber supplying motive fluid to said chambers, an exhaust chamber for the final exit of said motive fluid, said pressure chambers being axially arranged in said stator and rotor and gradually enlarging towards the final exhaust chamber, and the inlet and outlet ports of said pressure chambers being arranged obliquely to the axes of the stator and rotor and adapted to conduct the motive fluid to and from said pressure chambers, when the rotor rotates, means for confining the motive fluid at different pressures in said pressure chambers, and means for maintaining a pressure in the low pressure chamber substantially not less than one-half that in the high pressure chambers.

11. In a turbine, the combination of a stator and rotor having concentrically arranged pressure chambers, an annular initial high pressure chamber supplying motive fluid to said pressure chambers, an annular exhaust chamber for the final exit of the motive fluid, said pressure chambers extending axially to the stator and rotor and gradually enlarging towards the final exhaust chamber, said pressure chambers having inlet and exhaust ports arranged obliquely to the axes of the stator and rotor and adapted to conduct motive fluid to and from said pressure chambers, when the rotor rotates, means for confining the motive fluid at different pressures and periodically equalizing the pressure in said chambers, and means for maintaining a pressure in the low pressure chambers substantially not less than one-half that in the high pressure chambers whereby, as the motive fluid flows from the high to the low pressure chambers, its expansion in lateral directions is prevented.

12. In a turbine, the combination with a stator and rotor having concentrically and annularly arranged recesses formed therein at oblique angles to their axes and adapted to register consecutively as the rotor rotates, of filling plates secured in said recesses to form motive fluid pressure chambers extending axially of the stator and rotor, and ports for conducting a motive fluid to and from said chambers when the rotor rotates.

In witness whereof, I have hereunto set my hand this 29th day of May, 1925.

WILLIAM D. SMALLEY.